(12) United States Patent
Fuchs

(10) Patent No.: US 9,140,196 B2
(45) Date of Patent: Sep. 22, 2015

(54) METHOD FOR CONTROLLING A GAS TURBINE AND GAS TURBINE FOR IMPLEMENTING THE METHOD

(75) Inventor: Herbert Fuchs, Nussbaumen (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 952 days.

(21) Appl. No.: 13/283,182

(22) Filed: Oct. 27, 2011

(65) Prior Publication Data

US 2012/0102968 A1    May 3, 2012

(30) Foreign Application Priority Data

Oct. 27, 2010  (CH) ........................................ 1786/10

(51) Int. Cl.
F02C 9/28    (2006.01)

(52) U.S. Cl.
CPC ............ *F02C 9/28* (2013.01); *F05D 2220/3212* (2013.01); *F05D 2270/303* (2013.01); *F05D 2270/3015* (2013.01)

(58) Field of Classification Search
CPC ................. F02C 9/28; F02C 2270/303; F02C 2270/3015
USPC ........... 60/773, 39.24, 39.281, 235, 240, 243, 60/764
See application file for complete search history.

(56) References Cited

U.S. PATENT DOCUMENTS

| 2,750,741 | A | * | 6/1956 | Leeper | ........................ 60/39.281 |
| 2,892,309 | A | * | 6/1959 | Sipin | ............................... 60/790 |
| 2,936,974 | A | * | 5/1960 | Shaw | ............................ 244/76 J |
| 4,000,607 | A | * | 1/1977 | Bolliger | .......................... 60/773 |
| 4,493,187 | A | * | 1/1985 | Hansen | ....................... 60/39.281 |
| 4,744,670 | A | | 5/1988 | Janssen | |
| 6,167,690 | B1 | | 1/2001 | Hepner et al. | |
| 2004/0060298 | A1 | * | 4/2004 | Han et al. | ......................... 60/772 |
| 2005/0276306 | A1 | | 12/2005 | Mick et al. | |
| 2008/0229746 | A1 | | 9/2008 | Zhang et al. | |
| 2009/0222187 | A1 | | 9/2009 | Martling et al. | |

FOREIGN PATENT DOCUMENTS

| EP | 0 890 888 A1 | 1/1999 |
| EP | 1 602 904 A1 | 12/2005 |
| WO | WO 2007/045528 A1 | 4/2007 |

OTHER PUBLICATIONS

Swiss Search Report for CH 17862010 dated Feb. 25, 2011.

* cited by examiner

*Primary Examiner* — Gerald L Sung
(74) *Attorney, Agent, or Firm* — Buchanan Ingersoll & Rooney PC

(57) ABSTRACT

A method for controlling a gas turbine, including during transient operating states, and such a gas turbine are provided. The gas turbine includes a compressor for compressing inducted combustion air, a combustion chamber for generating hot gas by combusting a fuel with the aid of the compressed combustion air, and a multistage turbine for expanding the generated hot gas and performing work. The controlling of the gas turbine is carried out in accordance with the hot gas temperature which is derived from a plurality of other measured operating variables of the gas turbine. A reliable controlling of the gas turbine is achieved, even during rapid changes, by pressure measurements being gathered exclusively at different points of the gas turbine for derivation of the hot gas temperature.

25 Claims, 1 Drawing Sheet

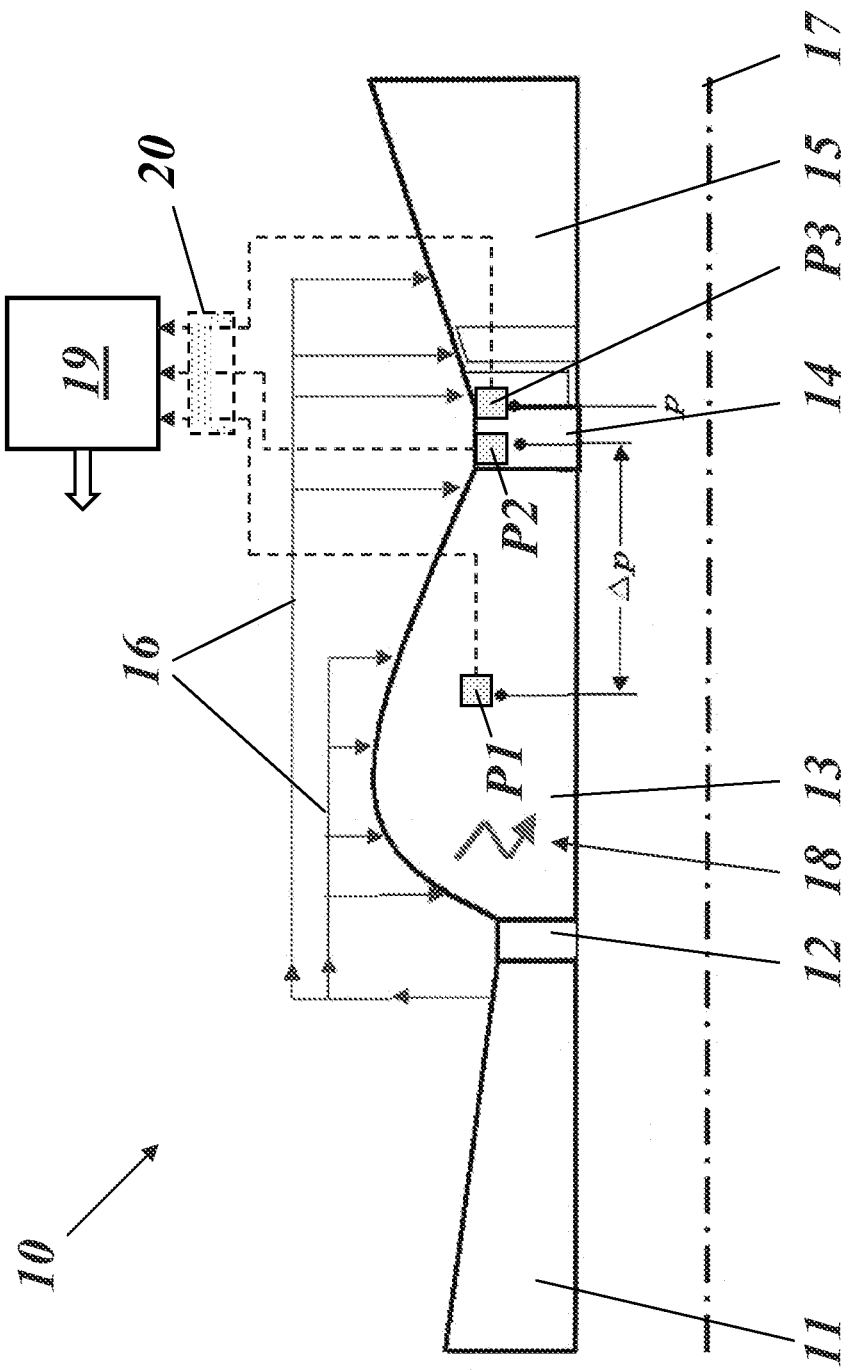

METHOD FOR CONTROLLING A GAS TURBINE AND GAS TURBINE FOR IMPLEMENTING THE METHOD

RELATED APPLICATION

This application claims priority under 35 U.S.C. §119 to Swiss Patent Application No. 01786/10 filed in Switzerland on Oct. 27, 2010, the entire content of which is hereby incorporated by reference in its entirety.

FIELD

The present disclosure relates to the field of gas turbines. More particularly, the present disclosure relates to a method for controlling a gas turbine, and to a gas turbine for implementing the method.

BACKGROUND INFORMATION

It is known to control the fuel quantity of a gas turbine by the hot gas temperature (turbine inlet temperature TIT) being calculated in a machine control unit with the aid of a mathematical approximation, which requires the turbine exhaust temperature (TAT), measured on the machine, and/or the exit pressure of the compressor as input variables (see EP 890 888 A1, for example).

Especially during transient operating states, for example during sudden load changes, such a control mechanism can lead to dangerous overswings of the hot gas temperature because the turbine exhaust temperature signal is time-delayed.

SUMMARY

An exemplary embodiment of the present disclosure provides a method for controlling a gas turbine. The gas turbine includes a compressor for compressing inducted combustion air, a combustion chamber for generating hot gas by combusting a fuel with the aid of the compressed combustion air, and a multistage turbine for expanding the generated hot gas and performing work. The exemplary method includes controlling the gas turbine in accordance with a hot gas temperature which is derived from a plurality of other measured operating variables of the gas turbine. A derivation of the hot gas temperature is formed exclusively by means of pressure measurements at different points of the gas turbine.

An exemplary embodiment of the present disclosure provides a gas turbine which includes a compressor for compressing inducted combustion air, a combustion chamber for generating hot gas by combusting a fuel with the aid of the compressed combustion air, and a multistage turbine for expanding the generated hot gas and performing work. The exemplary gas turbine also includes a machine control unit, and at least two pressure sensors for measuring a pressure loss in the hot gas flow. The pressure sensors are arranged at different points in series in a flow direction in the region of the hot gas flow which is generated in the combustion chamber, and the pressure sensors are connected to the machine control unit. The machine control unit is configured to control the gas turbine in accordance with the hot gas temperature which is derived from a plurality of other measured variables of the gas turbine. A derivation of the hot gas temperature is formed exclusively by means of pressure measurements at the different points of the gas turbine.

BRIEF DESCRIPTION OF THE DRAWINGS

Additional refinements, advantages and features of the present disclosure are described in more detail below with reference to exemplary embodiments illustrated in the drawing, in which:

FIG. 1 shows a simplified schematic arrangement of a gas turbine with the measured variables drawn in, according to an exemplary embodiment of the present disclosure.

DETAILED DESCRIPTION

Exemplary embodiments of the present disclosure provide a method for controlling a gas turbine which avoids the disadvantages of known methods and which is able to achieve, with comparatively little cost, a reliable control, especially of transient states of the machine, and a gas turbine for implementing the method.

In accordance with an exemplary embodiment, the method is based on a gas turbine which includes a compressor for compressing inducted combustion air, a combustion chamber for generating hot gas by combusting a fuel with the aid of the compressed combustion air, and a multistage turbine for expanding the generated hot gas and performing work. In accordance with an exemplary embodiment, the controlling is carried out in accordance with the hot gas temperature which is derived from a plurality of other measured operating variables of the gas turbine. The exemplary method can also include forming a derivation or approximately mathematical determination of the hot gas temperature exclusively by pressure measurements at different points of the gas turbine.

In accordance with an exemplary embodiment of the method, the pressure measurements are carried out in the hot gas flow which is generated in the combustion chamber.

The pressure measurements can include, for example, a pressure loss measurement in the main flow of the gas turbine.

In accordance with an exemplary embodiment, the measuring positions, between which the pressure loss is determined, lie downstream of the flames which are present in the combustion chamber of the gas turbine.

In this case, the measuring positions, between which the pressure loss is determined, can lie exclusively in the combustion chamber.

In accordance with an exemplary embodiment, a turbine flange is located in the gas turbine at the transition between the combustion chamber and turbine, and the measuring positions, between which the pressure loss is determined, lie exclusively in the turbine flange.

In accordance with an exemplary embodiment, a turbine flange is located in the gas turbine at the transition between combustion chamber and turbine, and the measuring positions, between which the pressure loss is determined, lie both in the combustion chamber and in the turbine flange.

In accordance with an exemplary embodiment, in addition to the pressure loss measurement, the pressure directly upstream of the first blade row of the turbine is also measured.

In accordance with an exemplary embodiment, the hot gas temperature is derived from the pressure loss measurement and the pressure measurement directly upstream of the first blade row of the turbine in accordance with the formula:

$$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine while $p_{amb0}$ is the associated ambient pressure, both at a nominal point.

An exemplary embodiment of the present disclosure also provides that the pressure measurements possible pulsation signals, which emanate from combustion chamber pulsations, are suppressed by means of time-based averaging or filtering.

In accordance with an exemplary embodiment, a gas turbine for implementing the method includes a compressor for compressing inducted combustion air, a combustion chamber for generating hot gas by combusting a fuel with the aid of the compressed combustion air, and a multistage turbine for expanding the generated hot gas and performing work. The gas turbine includes two pressure sensors for measuring the pressure loss in the hot gas flow, wherein the pressure sensors are arranged in series in the flow direction in the region of hot gas flow which is generated in the combustion chamber, and the pressure sensors are connected to a machine control unit of the gas turbine.

An exemplary embodiment of the gas turbine according to the present disclosure provides that the two pressure sensors are located in the region of the combustion chamber.

An exemplary embodiment of the present disclosure provides that a turbine flange is located in the gas turbine at the transition between combustion chamber and turbine, and at least one of the pressure sensors is located in the region of the turbine flange.

For example, the two pressure sensors can be located in the region of the turbine flange.

In accordance with an exemplary embodiment, a third pressure sensor can be located directly upstream of the first blade row of the turbine and can be connected to the machine control unit of the gas turbine.

In accordance with an exemplary embodiment, the pressure sensors are connected to the machine control unit of the gas turbine via a device for suppressing pulsation signals.

All explained advantages can be applied not only in the respectively disclosed combinations but also in other combinations or on their own without departing from the scope of the present disclosure. In addition, for controlling the gas turbine, for example, a combination of derivations of the hot gas temperature can be used, wherein at least one derivation is formed with the aid of the pressure measurements. A second derivation can be formed, for example, as described in EP 890 888 A1. Both derivations can be combined with each other in a suitable manner. For example, the second derivation (approximation) results during steady-state operation and the proposed new derivation results during transient operation.

FIG. 1 shows a simplified schematic arrangement of a gas turbine 10, as is suitable for implementing the method according to the present disclosure. In an axial arrangement along an axis 17, the gas turbine 10 includes a compressor 11 for compressing inducted combustion air, and a combustion chamber 13 in which a fuel, by introduction of the compressed air, is combusted with a flame 18 and in the process generates a hot gas which flows out of the combustion chamber 13 through a subsequent multistage turbine 15 and is expanded there, performing work. A compressor flange 12 is located between the compressor 11 and the combustion chamber 13. In the same way, a turbine flange 14 is provided between the combustion chamber 13 and the turbine 15. A first blade row (e.g., stator blades) and a second blade row (e.g., rotor blades) are drawn in inside the turbine 15. Within the limits of a cooling system 16, compressed air is tapped off from the compressor 11 and fed at different points to the combustion chamber 13 and to the turbine 15.

For controlling the gas turbine 10, provision is made for a machine control unit 19 which obtains various measured variables from the gas turbine 10 and acts upon the fuel supply of the gas turbine 10 (indicated in FIG. 1 by means of the block arrow which extends from the machine control unit 19). In accordance with an exemplary embodiment, a pressure loss $\Delta p$ in the hot gas flow downstream of the flame 18 and a pressure p directly upstream of the first blade row of the turbine 15 are recorded as measured variables. Corresponding pressure sensors P1, P2 and P3, which are connected to the machine control unit 19, are provided for this purpose.

In order to free the recorded pressure signals of interfering pulsation signals which emanate from combustion chamber pulsations, it is advantageous to direct the measured pressure signal to the machine control unit 19 by means of a device 20 for suppressing pulsation signals (drawn in by dashed lines in FIG. 1). Such a device 20 could be designed for averaging, wherein the averaging duration amounts to at least approximately 5 to 10 times the position frequency. The device 20, however, may also include a correspondingly adapted filter.

In accordance with an embodiment, the gas turbine and the method can have the following characteristic features:

1. For controlling the hot gas temperature, a temperature measurement signal is not required. The hot gas temperature can be calculated exclusively from pressure measurements. Since the pressure in the machine varies with sonic velocity, there is practically no time delay for the input measurement signal to the machine control unit 19. In this way, potentially hazardous non-stable overswings of the hot gas temperature can be avoided.

2. In contrast to previous solutions, in which partially complex mathematical approximations (polynomials, for example) were used, the proposed solution of the present disclosure is based on a physical law with a broad range of application in the actual machine, for example, in the constant turbine capacity for a multistage turbine.

3. Only two input variables which are to be measured are required:
   a. the pressure upstream of the turbine; and
   b. a representative and suitable pressure loss measurement in the main flow.

The physical basis of the embodiment is the turbine capacity. The turbine capacity, as is also referred to as "reduced mass flow", is defined for a multistage turbine as follows:

$$\frac{\dot{m}\sqrt{R \cdot T}}{p} = const(T, n), \quad (1)$$

wherein $\dot{m}$[kg/s] is the mass flow, R[kJ/kg/K] is the gas constant, T[K] is the temperature (hot gas temperature) and p[bar] is the pressure upstream of the blade row of the turbine.

In accordance with an exemplary embodiment, the turbine capacity is constant. It depends a little upon the temperature T and the rotational speed n(Hz). The turbine capacity increases slightly with increasing T and also increases slightly with decreasing rotational speed.

An exemplary embodiment of the present disclosure provides for the special application of the above formula (1) for transient controlling of the gas turbine 10. For this, the formula (1), with the aid of several assumptions which are valid for the considered operating range of the gas turbine 10, is converted.

The resolution of the formula (1) according to the temperature results in:

$$T = const(T, n)^2 \frac{p^2}{\dot{m}^2} \cdot \frac{1}{R}. \tag{1a}$$

Let Δp [bar] now be a representative and suitable pressure loss measured value in the main flow of the turbine (see FIG. 1). The measuring positions, between which the pressure loss is determined, can largely be optionally selected, but must lie downstream of the flames in the combustion chamber 13 of the gas turbine 10. The corresponding measuring section can lie exclusively in the combustion chamber 13 or exclusively in the turbine flange 14, or, as shown in FIG. 1, it can be located in both sections of the gas turbine. The position of the measuring section depends upon the specific construction of the gas turbine 10 and can be optimally selected, taking into consideration this construction.

For the dependency of the mass flow inside the pressure loss measuring section, $\dot{m}_{\Delta p}$, the following proportionality results:

$$\dot{m}_{\Delta p}^2 \propto \overline{\rho}_{\Delta p} \cdot \Delta p(T) \propto \frac{\overline{p}_{\Delta p}}{\overline{R}_{\Delta p} \cdot \overline{T}_{\Delta p}} \cdot \Delta p \propto \frac{\Delta p^2}{\overline{R}_{\Delta p}}, \tag{2}$$

wherein $\overline{\rho}_{\Delta p}[kg/m^3]$ refers to the average density. Using the ideal gas equation, this average density can be expressed by the average pressure $\overline{p}_{\Delta p}[bar]$, the average gas constant $\overline{R}_{\Delta p}[kJ/kg/K]$ and the average temperature $\overline{T}_\rho[K]$ in the pressure loss measuring section.

It has become apparent that in the formula (2) at least the proportionality $$\dot{m}_{\Delta p}^2 \propto \frac{\Delta p^2}{\overline{R}_{\Delta p}} \tag{2a}$$

remains.

Furthermore, the following proportionalities can additionally be found:

$$\dot{m} \propto \dot{m}_{\Delta p} \tag{3}$$

and $$R \propto \overline{R}_{\Delta p}. \tag{4}$$

If the formulae (2a), (3) and (4) are now entered into the equation (1a), the following formula is obtained:

$$T = const^*(T, n) \cdot \left(\frac{p}{\Delta p}\right)^2. \tag{5}$$

The dependency upon the temperature T in the expression const*(T,n) can be eliminated by applying the isentropic equation:

$$const^*(T, n) = const^{**}(n) \cdot \left(\frac{p}{p_0}\right)^{\frac{1.31-1}{1.31}}. \tag{6}$$

The ambient pressure $p_{amb}$ can be taken into account in the formula (5) by means of a term from the isentropic equation, $$\left(\frac{p_{amb_0}}{p_{amb}}\right)^{\frac{1.31-1}{1.31}}, \tag{7}$$

wherein $p_0$[bar] is the pressure upstream of the turbine 15, and $p_{amb0}$ is the associated ambient pressure, both at a nominal point.

(1.31) is the isentropic coefficient which is a function of the temperature. In the range of hot gas temperatures of known gas turbines, the value is 1.31. Depending upon the turbine, it may also be higher or lower, however.

By using the expressions (6) and (7) in the formula (5), the following formula is obtained for the application of the transient hot gas temperature controlling:

$$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p). \tag{8}$$

According to this formula, the machine control unit 19 can very quickly determine the hot gas temperature T from the measured variables p and Δp which are recorded with almost no delay and correspondingly intervene in the fuel feed to the combustion chamber 13. In this way, during transient operating states, overswings of the hot gas temperature and endangerment to the machine which is associated therewith can be reliably avoided.

The depicted exemplary embodiments of the present disclosure only serve for explanation and are not to be construed as being limiting. For example, the exemplary embodiments of the present disclosure can also be applied to gas turbines with two or more combustion chambers and/or turbines.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 Gas turbine
11 Compressor
12 Compressor flange
13 Combustion chamber
14 Turbine flange
15 Turbine (multistage)
16 Cooling system
17 Axis
18 Flame
19 Machine control unit
20 Device for suppressing pulsation signals (averaging unit or filter, for example)
P1-P3 Pressure sensor

What is claimed is:
1. A method for controlling a gas turbine, wherein the gas turbine comprises a compressor for compressing inducted combustion air, a combustion chamber for generating hot gas by combusting a fuel with the aid of the compressed combustion air, and a multistage turbine for expanding the generated hot gas and performing work, wherein the method comprises:

controlling the gas turbine in accordance with a hot gas temperature which is derived from a plurality of other measured operating variables of the gas turbine, wherein a derivation of the hot gas temperature is formed exclusively through pressure measurements at different spatial points in a flow direction in a region of hot gas flow of the gas turbine, wherein the pressure measurements are carried out in the hot gas flow which is generated in the combustion chamber, and wherein the pressure measurements include a pressure loss measurement in a main flow of the gas turbine.

2. The method as claimed in claim 1, wherein the measuring positions, between which the pressure loss is determined, lie downstream of flames which are present in the combustion chamber of the gas turbine.

3. The method as claimed in claim 2, wherein the measuring positions, between which the pressure loss is determined, lie exclusively in the combustion chamber.

4. The method as claimed in claim 3, wherein in addition to the pressure loss measurement, a pressure directly upstream of a first blade row of the turbine is measured.

5. The method as claimed in claim 4, wherein the hot gas temperature is derived from the pressure loss measurement and the pressure measurement directly upstream of the first blade row of the turbine in accordance with the formula $$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine and $p_{amb0}$ is the associated ambient pressure, both at a nominal point.

6. The method as claimed in claim 2, wherein a turbine flange is located in the gas turbine at the transition between the combustion chamber and the turbine, and wherein the measuring positions, between which the pressure loss is determined, lie exclusively in the turbine flange.

7. The method as claimed in claim 6, wherein in addition to the pressure loss measurement, a pressure directly upstream of a first blade row of the turbine is measured.

8. The method as claimed in claim 7, wherein the hot gas temperature is derived from the pressure loss measurement and the pressure measurement directly upstream of the first blade row of the turbine in accordance with the formula $$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine and $p_{amb0}$ is the associated ambient pressure, both at a nominal point.

9. The method as claimed in claim 2, wherein a turbine flange is located in the gas turbine at the transition between the combustion chamber and the turbine, and wherein the measuring positions, between which the pressure loss is determined, lie both in the combustion chamber and in the turbine flange.

10. The method as claimed in claim 9, wherein in addition to the pressure loss measurement, a pressure directly upstream of a first blade row of the turbine is measured.

11. The method as claimed in claim 10, wherein the hot gas temperature is derived from the pressure loss measurement and the pressure measurement directly upstream of the first blade row of the turbine in accordance with the formula $$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine and $p_{amb0}$ is the associated ambient pressure, both at a nominal point.

12. The method as claimed in claim 2, wherein in addition to the pressure loss measurement, a pressure directly upstream of a first blade row of the turbine is measured.

13. The method as claimed in claim 12, wherein the hot gas temperature is derived from the pressure loss measurement and the pressure measurement directly upstream of the first blade row of the turbine in accordance with the formula $$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine and $p_{amb0}$ is the associated ambient pressure, both at a nominal point.

14. The method as claimed in claim 1, wherein in addition to the pressure loss measurement, a pressure directly upstream of a first blade row of the turbine is measured.

15. The method as claimed in claim 14, wherein the hot gas temperature is derived from the pressure loss measurement and the pressure measurement directly upstream of the first blade row of the turbine in accordance with the formula $$T = const^{**}(n) \cdot \left(\frac{p}{\Delta p}\right)^2 \cdot \left(\frac{p \cdot p_{amb_0}}{p_0 \cdot p_{amb}}\right)^{\frac{1.31-1}{1.31}} = F(p, \Delta p)$$

wherein n is the rotational speed, $p_{amb}$ is the ambient pressure and $p_0$ is the pressure upstream of the turbine and $p_{amb0}$ is the associated ambient pressure, both at a nominal point.

16. The method as claimed in claim 1, wherein in the pressure measurements, possible pulsation signals, which emanate from combustion chamber pulsations, are suppressed by means of one of time-based averaging and filtering.

17. The method as claimed in claim 1, wherein the controlling of the gas turbine comprises controlling the gas turbine during transient operating states of the gas turbine.

18. The method as claimed in claim 1, wherein the different spatial points are arranged in series in the flow direction.

19. The method as claimed in claim 1, wherein the pressure measurements are made through at least two different spatial points in a flow direction in a region of hot gas flow.

20. A gas turbine comprising:
a compressor for compressing inducted combustion air;
a combustion chamber for generating hot gas by combusting a fuel with the aid of the compressed combustion air;
a multistage turbine for expanding the generated hot gas and performing work;
a machine control unit;

at least two pressure sensors for measuring a pressure loss in the hot gas flow, the pressure sensors being arranged at different points in series in a flow direction in the region of the hot gas flow which is generated in the combustion chamber, and the pressure sensors being connected to the machine control unit; and a turbine flange arranged in the gas turbine at a transition between the combustion chamber and the turbine, wherein the machine control unit is configured to control the gas turbine in accordance with the hot gas temperature which is derived from a plurality of other measured variables of the gas turbine, wherein a derivation of the hot gas temperature is formed exclusively by means of pressure measurements at the different points of the gas turbine, and wherein at least one of the pressure sensors is located in a region of the turbine flange.

21. The gas turbine as claimed in claim 20, wherein the pressure sensors are located in the region of the combustion chamber.

22. The gas turbine as claimed in claim 20, wherein the pressure sensors are located in the region of the turbine flange.

23. The gas turbine as claimed in claim 20, comprising:
a third pressure sensor located directly upstream of a first blade row of the turbine and being connected to the machine control unit of the gas turbine.

24. The gas turbine as claimed in claim 23, wherein the pressure sensors are connected to the machine control unit of the gas turbine via a device for suppressing pulsation signals.

25. The gas turbine as claimed in claim 20, wherein the pressure sensors are connected to the machine control unit of the gas turbine via a device for suppressing pulsation signals.

* * * * *